United States Patent
Wang et al.

(10) Patent No.: US 11,615,523 B2
(45) Date of Patent: Mar. 28, 2023

(54) METHODS FOR RECOGNIZING SMALL TARGETS BASED ON DEEP LEARNING NETWORKS

(71) Applicant: ZHEJIANG GONGSHANG UNIVERSITY, Zhejiang (CN)

(72) Inventors: Huiyan Wang, Hangzhou (CN); Huan Jiang, Hangzhou (CN)

(73) Assignee: ZHEJIANG GONGSHANG UNIVERSITY, Hangzhou (CN)

( * ) Notice: Subject to any disclaimer, the term of this patent is extended or adjusted under 35 U.S.C. 154(b) by 0 days.

(21) Appl. No.: 17/810,608

(22) Filed: Jul. 3, 2022

(65) Prior Publication Data
US 2023/0055146 A1 Feb. 23, 2023

Related U.S. Application Data

(63) Continuation of application No. PCT/CN2021/115494, filed on Aug. 31, 2021.

(30) Foreign Application Priority Data

Aug. 18, 2021 (CN) .......................... 202110947457.3

(51) Int. Cl.
*G06T 7/00* (2017.01)
*G06V 10/74* (2022.01)
*G06V 10/77* (2022.01)

(52) U.S. Cl.
CPC .......... *G06T 7/0008* (2013.01); *G06V 10/761* (2022.01); *G06V 10/7715* (2022.01);
(Continued)

(58) Field of Classification Search
CPC ......... G06T 7/0008; G06T 2207/20076; G06T 2207/20081; G06V 10/7715; G06V 10/761; G06V 2201/07
See application file for complete search history.

(56) References Cited

U.S. PATENT DOCUMENTS

2019/0251431 A1 3/2019 Keskar et al.
2019/0163904 A1 5/2019 Chung et al.

FOREIGN PATENT DOCUMENTS

CN 111260614 A 6/2020
CN 111681228 A 9/2020
(Continued)

OTHER PUBLICATIONS

Wang T, Zhang Z, Yang F, Tsui KL. Automatic Detection of Rail Components via A Deep Convolutional Transformer Network. arXiv preprint arXiv:2108.02423. Aug. 5, 2021. (Year: 2021).*
(Continued)

*Primary Examiner* — Vu Le
*Assistant Examiner* — Tracy Mangialaschi
(74) *Attorney, Agent, or Firm* — Metis IP LLC

(57) ABSTRACT

The present disclosure provides a method for recognizing a small target based on a deep learning network. The method comprises: determining, based on a collected image, spot defect information through a recognition model including a first feature determination layer, a second feature determination layer, and a spot defect determination layer, determining, based on the collected image, a first feature map, determining, based on the first feature map, a second feature map by fusing with positional encoding, determining, based on the second feature map, a third feature map through the second feature determination layer, and obtaining, based on the third feature map, positional information of the spot defect through a first determination layer, and determining, based on the third feature map, classification information of the spot defect through a second determination layer.

13 Claims, 13 Drawing Sheets

(52) U.S. Cl.
CPC ............... *G06T 2207/20076* (2013.01); *G06T 2207/20081* (2013.01); *G06V 2201/07* (2022.01)

(56) References Cited

FOREIGN PATENT DOCUMENTS

| | | |
|---|---|---|
| CN | 111899224 A | 11/2020 |
| CN | 112149619 A | 12/2020 |
| CN | 113240626 A | 8/2021 |
| CN | 113241075 A | 8/2021 |
| KR | 20200092143 A | 8/2020 |

OTHER PUBLICATIONS

Liu, Yang, Ke Xu, and Jinwu Xu. "Periodic surface defect detection in steel plates based on deep learning." Applied Sciences 9.15 (2019): 3127. (Year: 2019).*

International Search Report in PCT/CN2021/115494 dated May 13, 2022, 7 pages.

Written Opinion in PCT/CN2021/115494 dated May 13, 2022, 7 pages.

First Office Action in Chinese Application No. 202110947457.3 dated May 25, 2022, 9 pages.

* cited by examiner

METHODS FOR RECOGNIZING SMALL TARGETS BASED ON DEEP LEARNING NETWORKS

CROSS-REFERENCE TO RELATED APPLICATIONS

This application is a continuation of International Patent Application No. PCT/CN2021/115494, filed on Aug. 31, 2021, which claims priority of Chinese Patent Application No. 202110947457.3, filed on Aug. 18, 2021, the contents of which are hereby incorporated by reference to its entirety.

TECHNICAL FIELD

The present disclosure relates to a field of target recognition, and in particular to methods and systems for recognizing small targets.

BACKGROUND

In the process of industrial production, the detection of spot defect for output is a very important step. For example, the spot defect of a film is detected to avoid affecting the film performance due to excessive spots defect. When recognizing small targets such as spot defect, it is usually affected by factors such as small recognition targets, etc., the recognition rate and the accuracy of recognition may not be guaranteed.

Thus, it is desirable to provide an improved recognition method to increase the recognition rate of small targets such as spot defects and ensure the accuracy of recognition.

SUMMARY

One of the embodiments of the present disclosure provides a method for recognizing a spot defect. The method comprises: determining spot defect information through a recognition model based on a collected image, the recognition model including a first feature determination layer, a second feature determination layer, and a spot defect determination layer, determining, based on the collected image, a first feature map through the first feature determination layer, and determining, based on the first feature map, a second feature map by fusing with positional encoding through the first feature determination layer, determining, based on the second feature map, a third feature map through the second feature determination layer, determining, based on the third feature map, positional information of the spot defect through a first determination layer, and determining, based on the third feature map, classification information of the spot defect through a second determination layer.

One of the embodiments of the present disclosure provides a method for recognizing a spot defect. The second feature determination layer includes a self-attention layer used to determine the attention feature based on a Q matrix, a first K matrix, and a first V matrix, the Q matrix and the first K matrix are feature maps generated through a linear transformation of the second feature map, and the first V matrix is generated through correlation calculation of the Q matrix and the first K matrix.

One of the embodiments of the present disclosure provides a method for recognizing a spot defect. The self-attention layer is further used to: generate a second K matrix through performing a dimension reduction of convolution on the first K matrix and generate a second V matrix through performing the dimension reduction of convolution on the first V matrix. The second K matrix and the second V matrix are used for attention calculation.

One of the embodiments of the present disclosure provides a method for recognizing a spot defect. The self-attention layer is further used to: determine a first attention through calculation of matrix addition based on the Q matrix and a third K matrix, determine a second attention through calculation of matrix multiplication based on the Q matrix and the third K matrix, and determine an attention matrix based on the first attention and the second attention, the attention matrix being used for residual and normalization calculation and feedforward neural network calculation.

One of the embodiments of the present disclosure provides a method for recognizing a spot defect. The first attention is determined based on a QK distance and a probability density, the QK distance is a contraposition distance between a vector $q_{ij}$ in the Q matrix and a vector $k_{ij}$ in the K matrix, and the probability density is determined through a probability density function based on the contraposition distance.

One of the embodiments of the present disclosure provides a method for recognizing a spot defect. A weight ratio between the position difference and the intersection-over-union in the loss function is within a range of 2.4 to 2.6.

One of the embodiments of the present disclosure provides a system for recognizing a spot defect. The first feature determination module is configured to determine a first feature map based on a collected image and determine a second feature map through fusing with positional encoding based on the first feature map. The second feature determination module is configured to determine a third feature map based on the second feature map. The spot defect determination module is configured to determine positional information of the spot defect through the first determination layer based on the third feature map and determine classification information of the spot defect through the second determination layer based on a third feature.

One of the embodiments of the present disclosure provides a system for recognizing a spot defect. The second feature determining module includes a self-attention unit configured to determine attention features based on a Q matrix, a first K matrix, and the first V matrix, the Q matrix and the first K matrix are feature maps generated through the linear transformation of the second feature map, and the first V matrix is generated through correlation calculation of the Q matrix and the first K matrix.

One of the embodiments of the present disclosure provides a system for recognizing a spot defect. The self-attention unit is further configured to generate a second K matrix through performing a dimension reduction of convolution on the first K matrix and generate a second V matrix through performing the dimension reduction of convolution on the first V matrix, and the second K matrix and the second V matrix are used for attention calculation.

One of the embodiments of the present disclosure provides a system for recognizing a spot defect. The self-attention is further configured to determine a first attention through calculation of matrix addition based on the Q matrix and a third K matrix, determine a second attention through calculation of matrix multiplication based on the Q matrix and the third K matrix, and determine an attention matrix based on the first attention and the second attention, and the attention matrix is used for residual and normalization calculation and feedforward neural network calculation.

One of the embodiments of the present disclosure provides a system for recognizing a spot defect. The first attention is determined based on a QK distance and a probability density, the QK distance is a contraposition distance between a vector $q_{ij}$ in the Q matrix and a vector $k_{ij}$ in the K matrix, and the probability density is determined through a probability density function based on the contraposition distance.

One of the embodiments of the present disclosure provides a system for recognizing a spot defect. The recognition model is obtained by training, a loss function during the training includes a position loss item, the position loss item includes an intersection-over-union of a label box and a prediction box, and a position difference between the label box and the prediction box.

One of the embodiments of the present disclosure provides a system for recognizing a spot defect. The system further includes a training module for training the recognition model, and a loss function during the training includes a position loss item, the position loss item including an intersection-over-union of a label box and a prediction box and a position difference between the label box and the prediction box.

One of the embodiments of the present disclosure provides a system for recognizing a spot defect, wherein a weight ratio between the position difference and the intersection-over-union in the loss function is within a range of 2.4 to 2.6.

One of the embodiments of the present disclosure provide a non-transitory computer readable storage medium, including at least one set of instructions, when executed by at least one processor of a computing device, causing the computing device to perform a method for recognizing a spot defect, the method including determining, based on a collected image, spot defect information through a recognition model, which includes a first feature determination layer, a second feature determination layer, and a spot defect determination layer; determining, based on the collected image, a first feature map through the first feature determination layer, and determining, based on the first feature map, a second feature map by fusing with positional encoding through the first feature determination layer; determining, based on the second feature map, a third feature map through the second feature determination layer; determining, based on the third feature map, positional information of the spot defect through a first determination layer, and determining, based on the third feature, classification information of the spot defect through a second determination layer.

BRIEF DESCRIPTION OF THE DRAWINGS

The present disclosure will be further described in the form of exemplary embodiments, which will be described in detail by the accompanying drawings. These embodiments are not limited, in these embodiments, the same number denotes the same structure, wherein.

DETAILED DESCRIPTION

In order to more clearly explain the technical scheme of the embodiment of the present disclosure, the accompanying drawings required in the description of the embodiment will be briefly introduced below. Obviously, the drawings in the following description are only some examples or embodiments of the disclosure. For those skilled in the art, the present disclosure may also be applied to other similar situations according to these drawings without paying creative labor. Unless it is obvious or explained in the language environment, the same number in FIGs represents the same structure or operation.

It should be understood that the "system," "device," "unit" and/or "module" used herein is a method for distinguishing different components, elements, parts, sections, or assemblies of different levels. However, the terms may be displaced by another expression if they achieve the same purpose.

As shown in the present specification and claims, unless the context clearly prompts the exception, the words "one," "a," "an" and/or "the" do not specifically refer to singular, and the plural may be included. Generally speaking, the terms "comprise" and "include" only imply that the clearly identified steps and elements are included, and these steps and elements do not constitute an exclusive list, and the method or device may also include other steps or elements.

A flowchart is used in the present disclosure to explain the operation performed by the system according to the embodiments of the present disclosure. It should be understood that the foregoing or following operations may not necessarily be performed exactly in order. Instead, a plurality of steps may be processed in reverse or simultaneously. At the same time, other actions may be added to these procedures, or a step or steps may be removed from these procedures.

Figure 1:
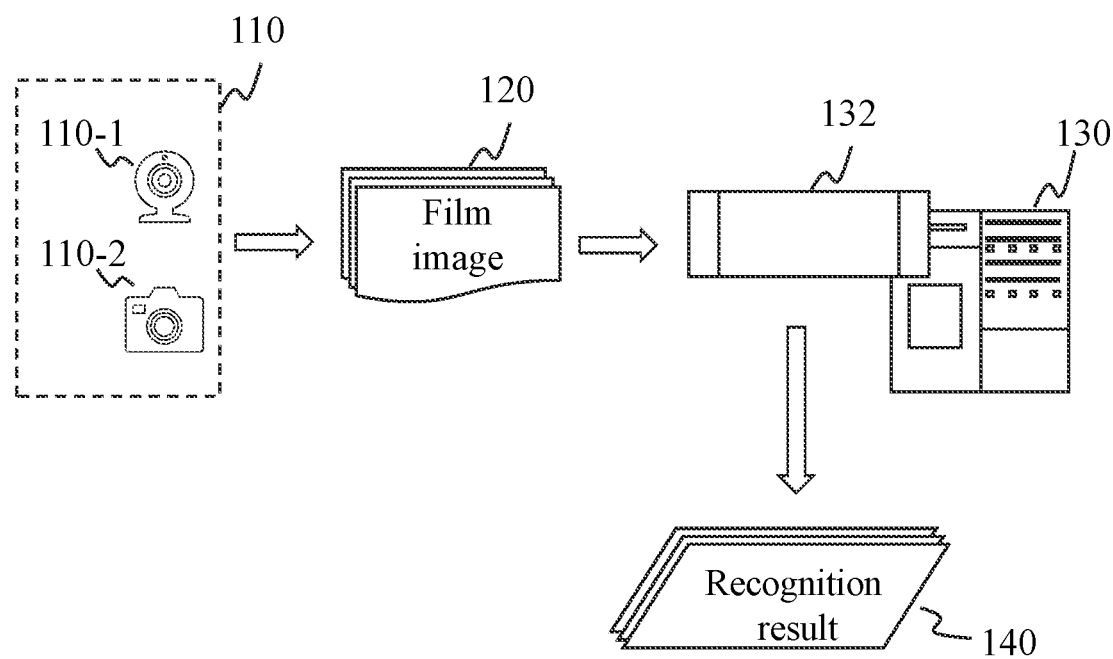
FIG. 1 is a schematic diagram for an application scenario of a system for recognizing a small target according to some embodiments of the present disclosure.

FIG. 1 is a schematic diagram for an application scene of a system for recognizing a small target according to some embodiments of the present disclosure. As shown in FIG. 1, the application scenario 100 of the system for recognizing the small target may include an image acquisition device 110, a film image 120, a processor 130, a recognition model 132, and a recognition result 140.

In some embodiments of the present disclosure, a small target recognition may also be called a spot defect recognition.

An image acquisition device 110 may be used to obtain at least one video image sequence or at least one image of the object to be detected, which may be the industrial output such as film that requires spot defect detection thereof. By way of example only, the image acquisition device 110 may include at least one of a webcam 110-1, a camera 110-2, or other device having an image acquisition function.

A film image 120 may include a sequence of video images of the film to be detected or at least one image at a different position, and the film image 120 may include spot defect information, and the above spot defect information may be determined by recognizing on the film image 120 through the recognition model 132. It should be noted that in some embodiments of the present disclosure, the film image 120 may be a collected image 310.

A processor 130 may process data and/or information obtained from other devices or system components, e.g., video image sequences of films, pictures, etc. The processor 130 may execute program instructions to perform one or more of the functions described in the present disclosure based on these data, information, and/or processing results. In some embodiments, the processor 130 may include one or more sub-processing devices (e.g., a single-core processing device or a multi-core multi-filamentary processing device).

In some embodiments, a processor 130, based on a thin film image 120 captured by the image acquisition device 110, may determine the recognition result 140 through the recognition model 132. The recognition model 132 may be a machine learning model. It should be noted that the recognition model 320 involved in FIG. 3 of the present disclosure is the same model as the recognition model 132 in FIG. 1, and more embodiments of the recognition model may be found in the relevant descriptions in FIG. 3.

In some embodiments, a recognition result 140 may include spot defect information 330, for example, positional information 330-1 and classification information 330-2 of the spot defect. More description of the spot defect information 330 may be found in the relevant descriptions in FIG. 2.

Figure 2:
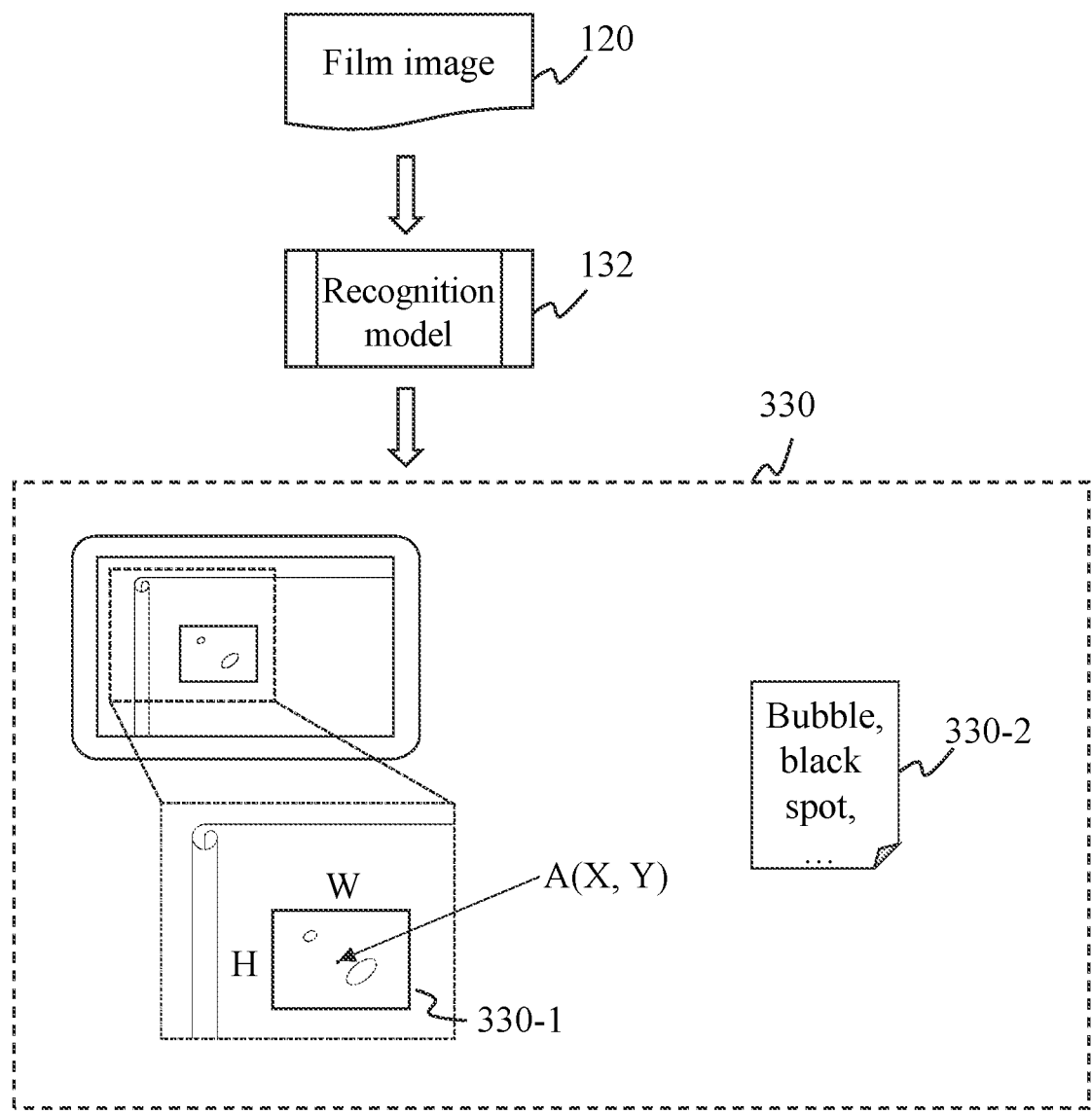
FIG. 2 is an exemplary flowchart of a method for recognizing a small target according to some embodiments of the present disclosure.

FIG. 2 is an exemplary flowchart of a method for recognizing a small target according to some embodiments of the present disclosure.

In some embodiments, the spot defect information 330 included in a film image 120 may be detected through the detection on the film image 120 by the recognition model 132.

In some embodiments, the spot defect information 330 may include positional information of the spot defect 330-1 and classification information of the spot defect 330-2. The positional information 330-1 of the spot defect may include the prediction boxes corresponding to the spot defects and the parameters related to each prediction box. As shown in FIG. 2, the prediction boxes of spot defect illustrate the positions of the bubble-class spot defect, and each prediction box includes four parameters X, Y, W, and H, X and Y denote the coordinates of the center point A of the prediction box, and W and H denote the width and height of the prediction box, respectively. The classification information of the spot defect 330-2 may include different classe of spot defects, e.g., bubbles, black spots, etc. In some cases, the classification information of spot defects may further include other classes, e.g., perforations, creases, foreign objects, etc., which depends on the actual production situation.

Figure 3:
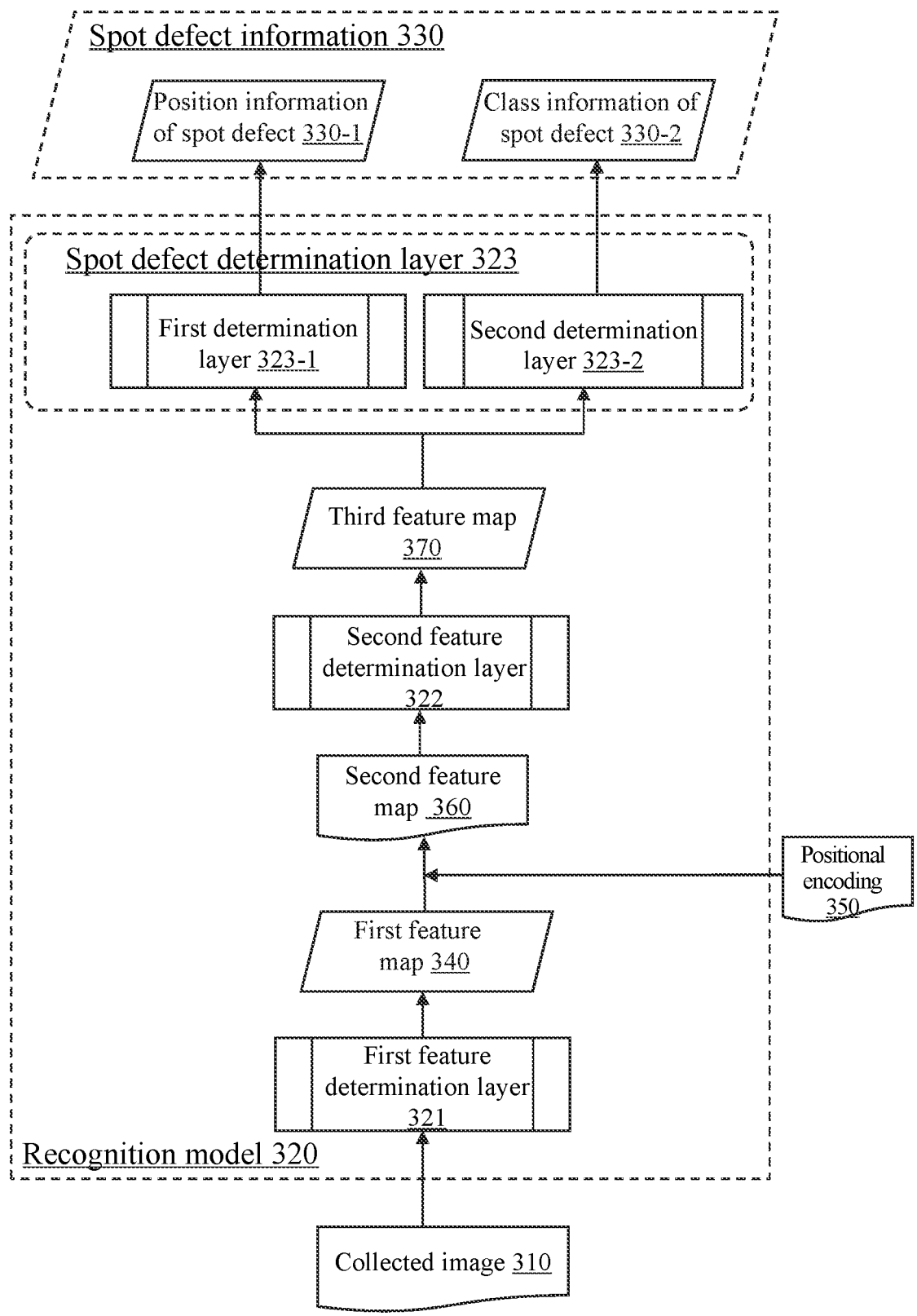
FIG. 3 is a schematic diagram of a structure of a recognition model according to some embodiments of the present disclosure.

FIG. 3 is a schematic diagram of a structure of a recognition model according to some embodiments of the present disclosure.

As shown in FIG. 3, the spot defect information may be determined through the recognition model 320. In some embodiments, the recognition model 320 may process the input collected image 310 to output the spot defect information 330, and the collected image 310 may include a sequence of video images of spot defects.

In some embodiments, the recognition model 320 may include a first feature determination layer 321, a second feature determination layer 322, and a spot defect determination layer 323.

The first feature determination layer 321 may perform feature extraction on the collected image 310 to determine a first feature map.

In some embodiments, the first feature extraction layer may obtain a first feature map through the following steps. First, the collected images 310 (e.g., video image sequences including spot defects) are input to the Deep Residual Network (ResNet) (e.g., ResNet-50) to obtain a first preliminary feature map of 7*7*2048. Then, in order to reduce the number of channels of the feature map, the first preliminary feature map is performed a convolution to obtain a first feature map of 7*7*256, where the size of the convolution kernel is 1, the step size is 1, and the number of convolutions is 256.

The first feature extraction layer may also be implemented in other ways, such as other ResNet, or different convolutional processing methods.

In some embodiments, a first feature determination layer 321 may determine a second feature map through fusing with positional encoding based on the first feature map.

In some embodiments, based on the first feature map, determining a second feature map through fusing with the positional encoding may include the following steps:

Flattening the first feature map. For example, the first feature map is flattened from 7*7*256 to 49*256, i.e., the height (H)*width (W)*number of channels (C) is flattened to (H*W)*C, and the height and width are compressed into the same dimension. The first feature map after being flattened is noted as a feature map X.

Determining a Q matrix, a K matrix, and a V matrix. For example, the feature map X of 49*256 is passed through three linear layers respectively ($W^Q$, $W^K$, $W^V$) to correspondingly obtain the Q-matrix, the K-matrix, and the V-matrix with the size of 49*256. The Q matrix and the K matrix are the feature maps of two dimensions of the feature map X. The V matrix is obtained by assigning values based on the matrix relevance of the Q matrix and the K matrix.

Adding positional information to Q matrix and K matrix. The recognition model may divide the dimensions in the Q matrix and K matrix into x-direction and y-direction. For example, the 256 dimensions in the Q matrix and K matrix with the size of 49*256 are divided into x-direction and y-direction, and the first 128 dimensions are in the x-direction and the last 128 dimensions are in the y-direction.

The positional encoding function for the x-direction is as follows.

$$f(x)^{(i)} = \begin{cases} \sin(w_k * x), & i = 2k \\ \cos(w_k * x), & i = 2k+1 \end{cases}, \quad (1)$$

-continued $$w_k = \frac{1}{10000^{2k/d}}, \quad (2)$$

where f(x) denotes the positional information, x denotes the position of current pixel point in row or column of the image, k denotes the current position, i denotes the number of dimensions, d denotes the dimension of the vector, 2k and 2k+1 denote whether the current position is even or odd, respectively. If the current position is even, the sin function is used. If the current position is odd, the cos function is used. The odd and even bits of the pixel points are separated through trigonometric functions so that all pixel positions are not duplicated.

Then adding the positional encoding to the y-direction in a similar way of the x-direction, as described above in relation to the positional encoding of the x-direction.

Finally, obtaining the Q matrix and K matrix with positional information. The V matrix, the Q matrix, and K matrix with positional information is used as the second feature map.

The second feature determination layer has a weak perception of the position to blocks, and the images put in the second feature determination layer are out of order. In some embodiments of the present disclosure, the corresponding position of each block may be determined by adding positional information, thereby the second feature determination layer may be positioned based on the position of the block.

In some embodiments, the second feature determination layer 322 may transform a second feature map 360 to obtain a third feature map 370. In some embodiments, the second feature determination layer may be implemented through a convolutional neural network. Some other embodiments regarding the second feature determination layer may be found in FIG. 4 and its relevant descriptions thereof.

The spot defect determination layer 323 may process the third feature map 370 to determine the spot defect information 330. In some embodiments, the spot defect determination layer 323 may include a first determination layer 323-1 and a second determination layer 323-2.

The input of the first determination layer 323-1 may be the third feature map 370 and the output of the first determination layer 323-1 may be the positional information 330-1 of the spot defects. In some embodiments, the first determination layer 323-1 may be a Multilayer Perceptron (MLP). The MLP may perform a regression of bounding box on the third feature map 370 to determine the positional information 330-1 of the spot defects. For example, the third feature map of 6*100*256 is input into the MLP. A 3-layer MLP is used as a prediction box, where the MLP has 256 input channels, 256 hidden layers, and 4 output layers. The output of the MLP is the prediction box of 100*4, and the prediction box mentioned above is the positional information 330-1 of the spot defect.

In some embodiments, the processor may input the third feature map 370 into the second determination layer 323-2 to determine the classification information 330-2 of the spot defects.

In some embodiments, the second determination layer 323-2 may be a Fully Connected Neural Network (FNN). The second determination layer 323-2 may classify the third feature map 370 to determine the classification information 330-2 of the spot defects and the corresponding confidence interval. For example, the third feature map of 6*100*256 is input into FNN. In the process of FNN, the number of channels of the third feature map is changed from 256 to n, and the output of the FNN is 100*n, where n represents the number of defect classes in the defect dataset. In some embodiments, the number of defect classes n may be set according to actual production needs.

The first determination layer and the second determination layer may be implemented in other ways.

In some embodiments, the recognition model may be obtained through training. More descriptions regarding the training recognition model may be found in FIGS. 5A and 5B and its relevant descriptions thereof.

Figure 4:
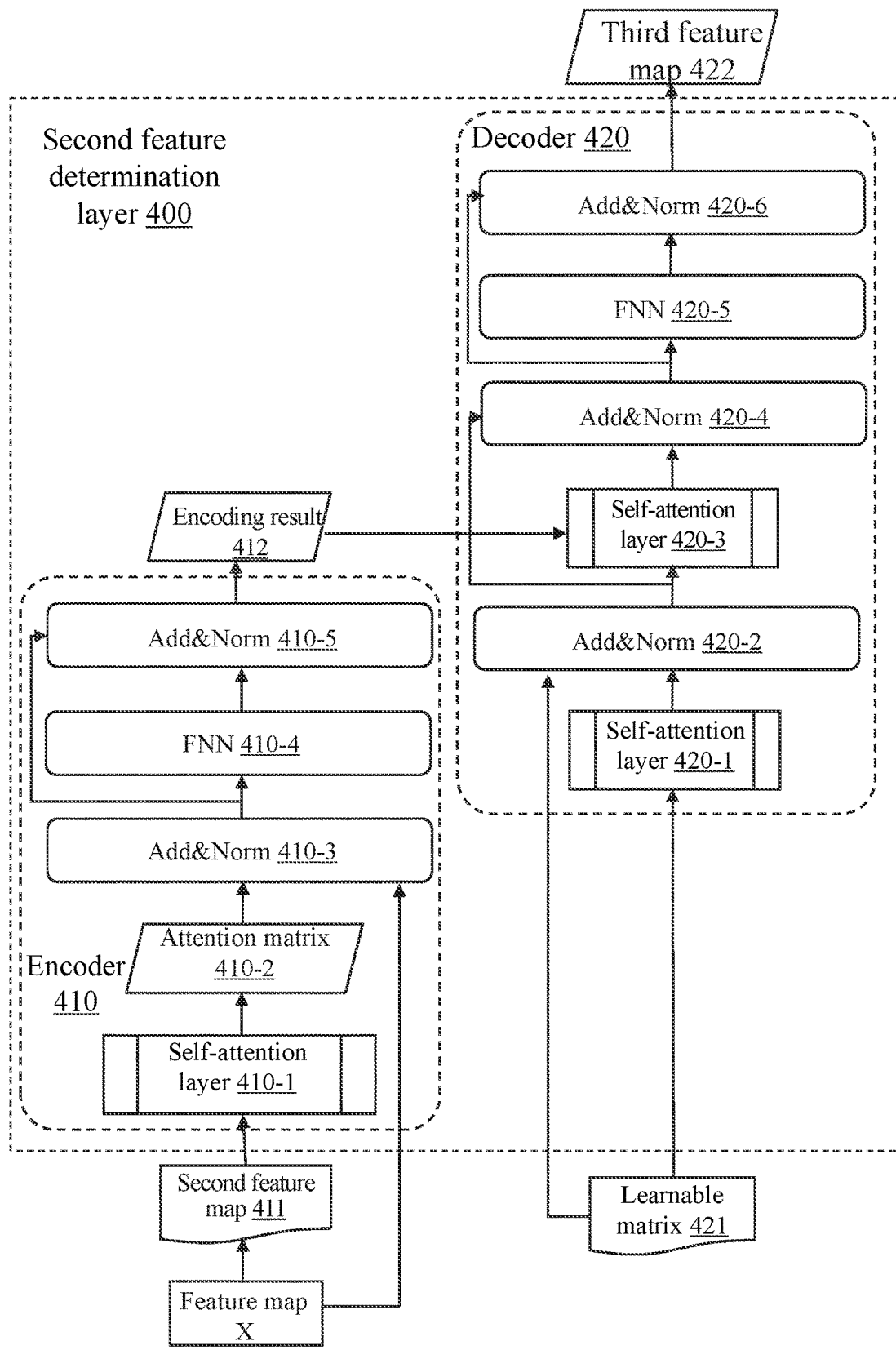
FIG. 4 is a schematic diagram of a structure of a second feature determination layer according to some embodiments of the present disclosure.

FIG. 4 is a schematic diagram of a structure of the second feature determination layer according to some embodiments of the present disclosure.

As shown in FIG. 4, in some embodiments, the second feature determination layer 400 may include an encoder 410 and a decoder 420.

In some embodiments, the second feature determination layer may be provided with a plurality of (e.g., six) tandem encoders 410, the first encoder may process the input second feature map 411 to output the encoding result, subsequent encoders may take the output of the previous encoder as input, and the encoding result 412 output from the last encoder may be used as input of the decoder.

In some embodiments, the process of encoder 410 includes the following contents.

The processor, based on the input, may determine the attention matrix 410-2 through the self-attention layer 410-1. More descriptions regarding the attention matrix being determined through the self-attention layer may be found in FIGS. 5A and 5B and its relevant descriptions thereof.

The processor may input the attention matrix into the first Add&Norm layer 410-3 to obtain a first result, and the Add operation may include the sum of the attention matrix and the feature map X. The Norm operation may include performing normalization to the result of Add operation.

The first result is input into the first feedforward neural network 410-4 (FNN) to obtain the second result. For example, first, the first result is input into a full connection layer to change the number of channels from 256 to 2048. Then the dropout is set to 0.1 through the Relu activation function. Finally, the number of channels is changed from 2048 to 256 and the dropout is set to 0.1 through a full connection layer.

A second result is input into the second Add&Norm layer 410-5 to obtain the encoding result. In some embodiments, the second Add&Norm layer is implemented similarly to the first Add&Norm layer, and the implementation of the second Add&Norm layer may be found in the corresponding descriptions of the first Add&Norm layer above.

The decoder 420 may process an input learnable matrix 421 and an encoding result 412 to output the third feature map 422. In some embodiments, the second feature determination layer may be provided with a plurality of (e.g., six) tandem decoders. The first decoder may process an input learnable matrix 421 and an encoding result 412 to output the third feature map 422. The subsequent decoder may take the output and decoding result of the previous decoder as input and take the third feature maps output from each decoder as the output of decoder.

In some embodiments, a learnable matrix 421 is a matrix with a random initialization size of 100*256, and 100 is a preset number of targets.

The decoder may be implemented through the decoder of transformer technology, or in other ways.

In some embodiments, the process of decoder 420 includes the following contents.

The processor may transform the learnable matrix into a Q matrix, a K matrix, and a V matrix, the Q matrix and K matrix plus the learnable matrix respectively may be used to learn the relationship between the target and the global.

The learnable matrix and Q matrix, K matrix, and V matrix are input into the second self-attention layer 420-1 and then passed through the third Add&Norm layer 420-2 to obtain the third result.

The third result and the Q matrix, K matrix, and V matrix are input into a third self-attention layer 420-3 and a fourth Add&Norm layer 420-4 to obtain a fourth result. In some embodiments, the Q matrix input into the third self-attention layer is obtained by summing the third result and the learnable matrix. The K matrix input is obtained from the encoding result by adding the positional encoding through a linear layer $W^K$. The V matrix input is obtained by encoding results through a linear layer. The steps herein may not perform dimension reduction on the K matrix and V matrix.

The fourth result is input into the second feedforward neural network 420-5 and a fifth Add&Norm layer 420-6 to obtain the third feature map 422. In some embodiments, the setting of the second feedforward neural network may be the same as the second feedforward neural network in the encoder.

In some embodiments, the decoder eventually outputs third feature maps output by each decoder. For example, the decoder may output the third feature maps of 6*100*256, where "6" represents 6 decoders and the 6 third feature maps are respectively from the outputs of 6 decoders. In some embodiments, the processor may only take the results of the last decoder. During training, the results of 6 decoders are output because adding the same loss function supervision to the remaining 5 decoders may have an improvement on the decoding effect.

Figure 5A:
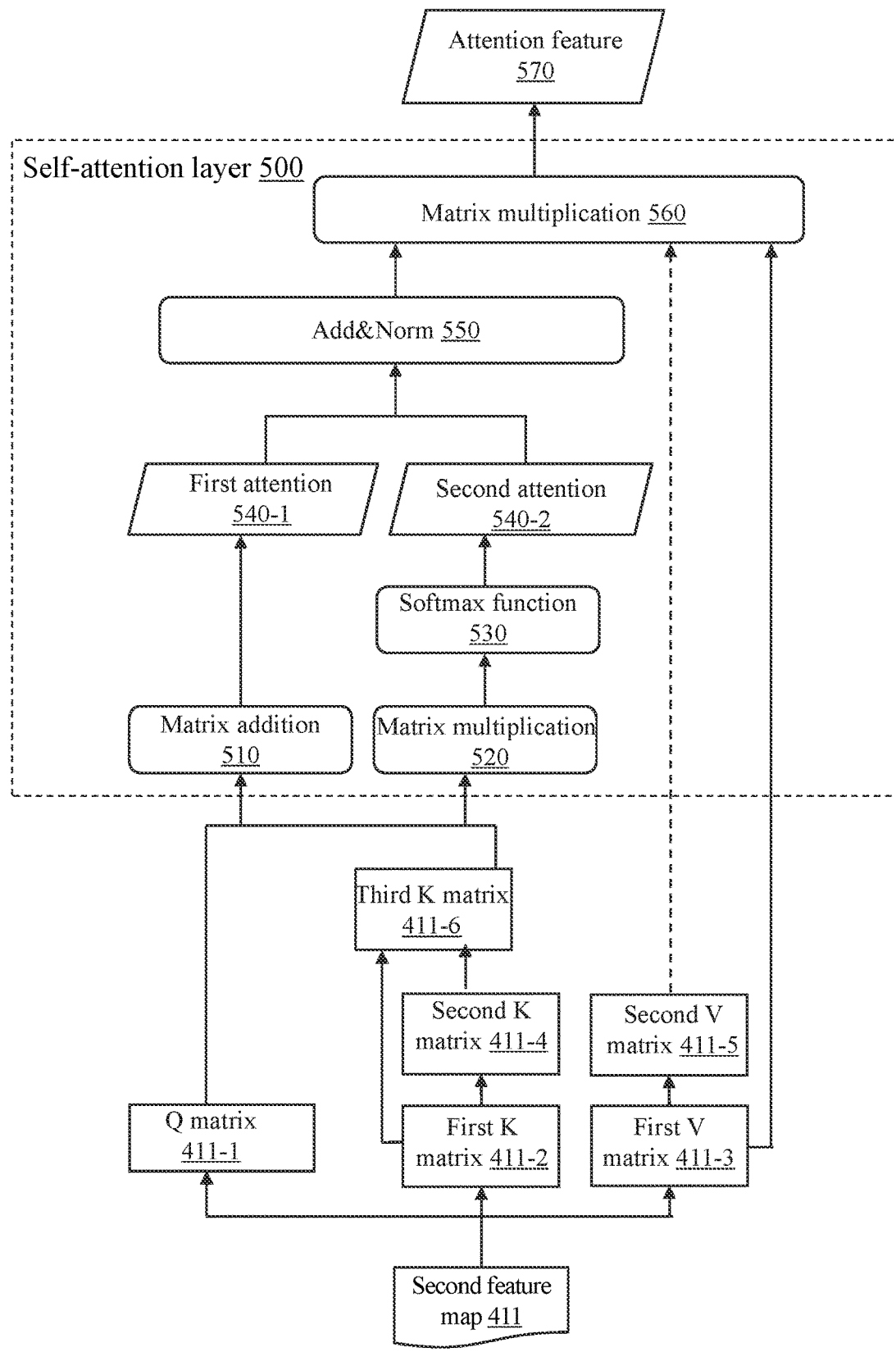
FIG. 5A is a schematic diagram of a structure of a self-attention layer according to some embodiments of the present disclosure.

FIG. 5A is a schematic diagram of a structure of a self-attention layer according to some embodiments of the present disclosure.

As shown in FIG. 5A, in some embodiments, the second feature determination layer includes a self-attention layer 500. The input of the self-attention layer 500 may be a second feature map 411 and the output of the self-attention layer 500 may be an attention feature 570. In some embodiments, the attention matrix may be the form of the attention feature.

In some embodiments, a self-attention layer 500, based on a Q matrix 411-1, a first K matrix 411-2, and a first V matrix 411-3, may determine attention features. The Q matrix and the first K matrix 411-2 may be parts of the second feature map or may be from the previous layer encoder. The first V matrix is generated by the Q matrix and the first K matrix 411-3 through correlation calculation.

The implementation regarding the generation of the first V matrix from the Q matrix and the first K matrix through correlation calculation is similar to the aforementioned methods of determining the V matrix, as described above in relation to determining the Q-matrix, K-matrix, and V-matrix.

In some embodiments, dimension reduction is performed on a first K matrix 411-2 based on the convolution to generate a second K matrix 411-4, dimension reduction is performed on the first K matrix 411-2 based on convolution to generate a second K matrix 411-5, and the second K matrix 411-4 and the second V matrix 411-5 are used for the attention calculation.

In some embodiments, performing dimension reduction to the first K matrix 411-2 and the first V matrix 411-3 may include the following steps.

The first K matrix and the first V matrix may be convolved to obtain a second initial K matrix and a second initial V matrix. For example, the first K matrix of 7*7*256 and the first V matrix of 3*3*256 are convolved to obtain the second initial K matrix of 3*3*256 and the second initial V matrix of 3*3*256. Where the convolution kernel is 3*3 and the step size is 2. It should be understood that the number of convolution kernels should be the same as the number of channels, which is 256.

The second initial K matrix and the second initial V-matrix are respectively flattened to obtain the second K matrix and the second V matrix. For example, a second initial K matrix of 3*3*256 and the second initial V matrix of 3*3*256 are flattened to a second K matrix of 9*256 and a second V matrix of 9*256.

The size of the Q matrix, the first K matrix, and the first V matrix before the dimension reduction are H*W*C, thus the complexity of the calculation is $O((H*W)^2*C)$, and the complexity of the improved calculation is O(H*W*h*w*C). For example, the above H*W=49 turns to the h*w=9 after performing convolution, the calculation complexity is reduced by about 5 times after dimension reduction. For a film scratch recognition, the information loss generated by these processes has little impact on the recognition results, but greatly improves the calculation speed of the self-attention layer.

In some embodiments, the processor, based on the Q matrix and a third K matrix 411-6, may determine the first attention 540-1 through the calculation including matrix addition 510.

In some embodiments, the third K matrix may be either the first K matrix or the second K matrix.

In some embodiments, through the calculation of matrix addition, determining the first attention 540-1 may include: determining the first attention based on the QK distance and the probability density. The QK distance is the contraposition distance between the vectors in the Q matrix and the vectors in the K matrix. The probability density may be determined based on the contraposition distance through the probability density function.

In some embodiments, the Q matrix and the third K matrix are input into an attention branch of the Gaussian distribution to determine the QK distance and probability density. In some embodiments, the process in the attention branch of the Gaussian distribution may include the following steps:

Obtaining the S matrix (i.e., the QK distance) through the calculation based on the Q matrix and the third K matrix. Specifically, each element of the S matrix is equal to the difference of the corresponding position elements in the Q matrix and the third K matrix, i.e., $s_{ij}=q_{ij}-k_{ij}$. The values of the obtained random variable S obey a Gaussian distribution of mathematical expectation μ=0 and variance $$\sigma^2 = \frac{1}{2\pi}.$$

The size of the S matrix is the same as the size of the matrix obtained from multiplying the Q matrix and the third K matrix.

Determining the probability density based on the S matrix. Specifically, the probability density function $\varnothing(s)=e^{(-\pi s)^2}\Phi$ is obtained by substituting μ=0 and $$\sigma^2 = \frac{1}{2\pi}$$

into the Gaussian distribution function $$f(x) = \frac{1}{\sqrt{2\pi}\,\sigma} e^{-\frac{(x-\mu)^2}{2\sigma^2}}.$$

$\Phi(s_{ij})$ may be obtained through calculating each element $s_{ij}$ in the S matrix. As the closer the value of $s_{ij}$ converges to 0 (i.e., the more $q_{ij}$ similar to $k_{ij}$), the larger the obtained value of $\Phi(s_{ij})$ is.

Determining the Gaussian distribution matrix G (i.e., the first attention 540-1). The Gaussian distribution matrix G is formed by $\Phi(s_{ij})$, where the elements $g_{ij}=\Phi(s_{ij})$. The element reflects the probability density of similarity of corresponding elements in the Q matrix, K matrix, and herein the distribution of similarity is assumed to obey the Gaussian distribution.

A piece of defect in an image often appears in the vicinity of the current pixel point and its surrounding pixel points, and although the locality around the current pixel point may be increased through the feature extraction of ResNet, the sensitivity to locality perception becomes lower as the network depth is deeper, which is not conducive to the detection of small targets w the defects. Some embodiments of the present disclosure may map the difference $s_{ij}$ to a probability density value through a probability density function to expand the difference between an obvious spot defect and an inconspicuous spot defect and improve the accuracy of detection of defects.

In some embodiments, the processor, based on the Q matrix and the third K matrix, may determine the second attention 540-2 by the calculation including matrix multiplication 520. In some embodiments, the processor, based on the Q matrix and the third K matrix, may determine the second attention 540-2 through the calculation of the matrix multiplication 520 and the softmax function 530.

In some embodiments, the processor may determine an attention matrix based on the first attention 540-1 and the second attention 540-2. The attention matrix may be used for residual and normalization calculations and feedforward neural network calculations.

In some embodiments, the results of the first attention and second attention may be passed through the Add&Norm layer 550 by a processor. The Add&Norm layer 550 performs an addition operation on the first attention 540-1 and the second attention 540-2 and normalizes the result of addition.

Finally, the output of the Add&Norm layer is multiplied with the V matrix through matrix multiplication 560 to obtain the final attention features 570.

In some embodiments, the second feature determination layer may be provided with six encoders. An attention matrix may be obtained by same steps for the self-attention layer of each encoder.

In some embodiments, the attention matrix may be used for residual and normalization calculations and feedforward neural network calculations in the second feature layer.

In the method for recognizing small targets provided in some embodiments of the present disclosure, an attention branch of a Gaussian distribution based on position that enhances locality is calculated in parallel and overlapped on its own attention, thus enabling the self-attention layer to increase the locality in the image, which may better learn the features of defects at the centimeter level and be more suitable for the detection of small targets with defects. Some embodiments of the present disclosure, the accuracy of the detection of small targets (e.g., defects) without affecting the speed may be improved through the addition of only one matrix.

Figure 5B:
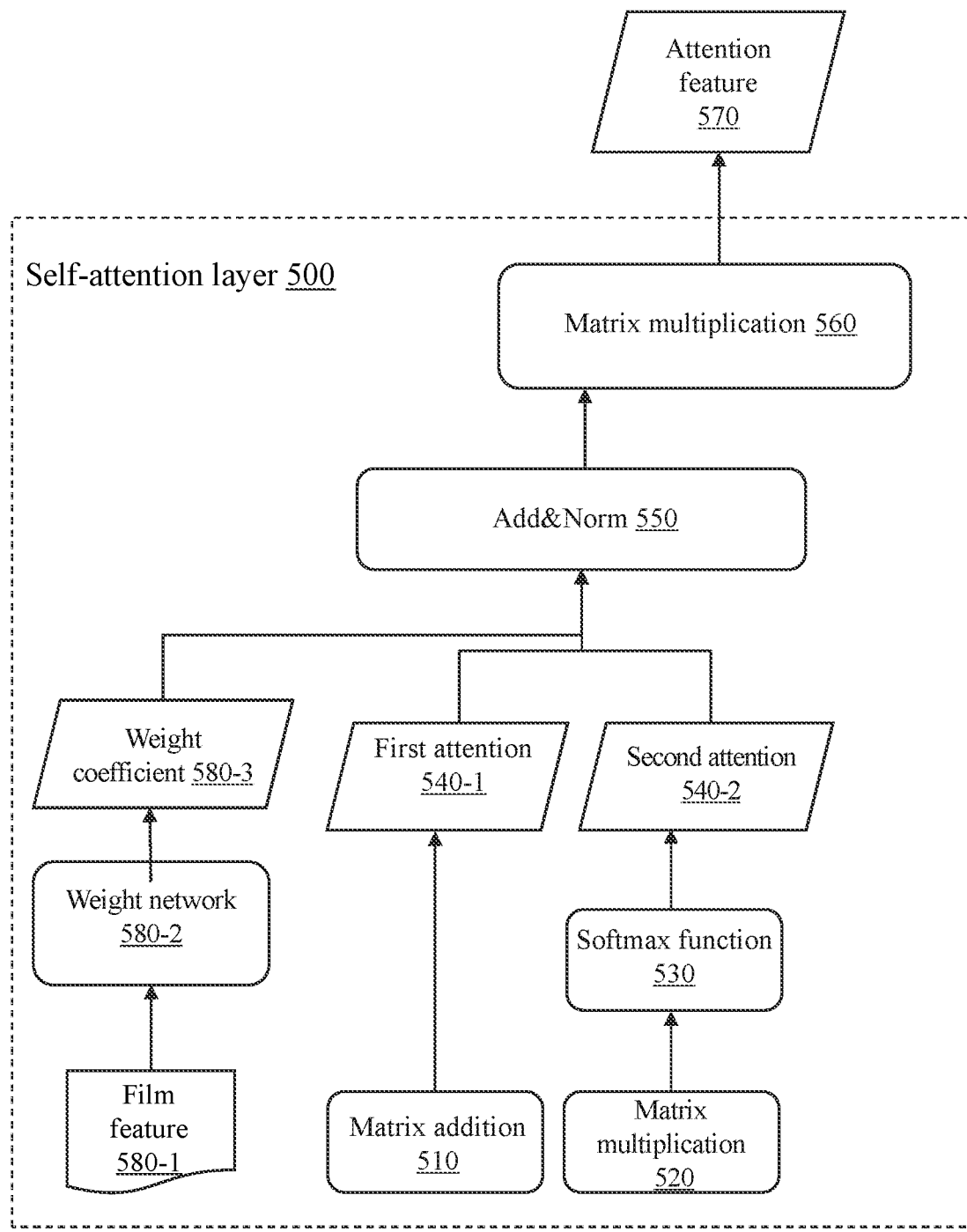
FIG. 5B is another schematic diagram of the structure of the self-attention layer according to some embodiments of the present disclosure.

FIG. 5B is another schematic view of the structure of the self-attention layer shown in accordance with some embodiments of the present specification. As shown in FIG. 5B, in some embodiments, the inputs of Add&Norm layer 550 in self-attention layer 500 may further include a weight coefficient.

In some embodiments, the weight coefficient 580-3 may be determined by film feature 580-1 through the weight network 580-2. Film feature may be some features of the film itself, e.g., material, color, smoothness, etc. In some embodiments, the film features may be denoted through film feature vectors, and the elements of film feature vectors may include the material, color, smoothness, etc. of the film.

In some embodiments, the weight network may be a multi-layer neural network, and the parameters of the weight network may be determined through joint training during the training of the recognition model.

In some embodiments, the weight coefficient may be a plurality of values with a sum of 1.

In the Add&Norm layer 550, multiple values may correspond to first attention 540-1 and second attention 540-2, respectively. The output of the Add&Norm layer 550 may be determined through adding the first attention 540-1 and the second attention 540-2 with the weight coefficient. For example, the fusion weight of (0.7, 0.3) may be obtained from the film features through a weight network, which indicates that the output of the Add&Norm layer is determined by the weighted first attention and second attention, i.e., $X'=0.7\times X_1+0.3\times X_2$, where X' denotes the output of the Add&Norm layer, $X_1$ denotes the first attention, and $X_2$ denotes the second attention.

Some embodiments of the present disclosure, it is flexibly adjusted the role of the local information based on Gaussian distribution according to the weight coefficient based on the features of different film, thereby improving the effect of detection. The weight may be generated through learnable parameters, further enhancing the adaptability of some embodiments of the present disclosure to different film detection.

Figure 6:
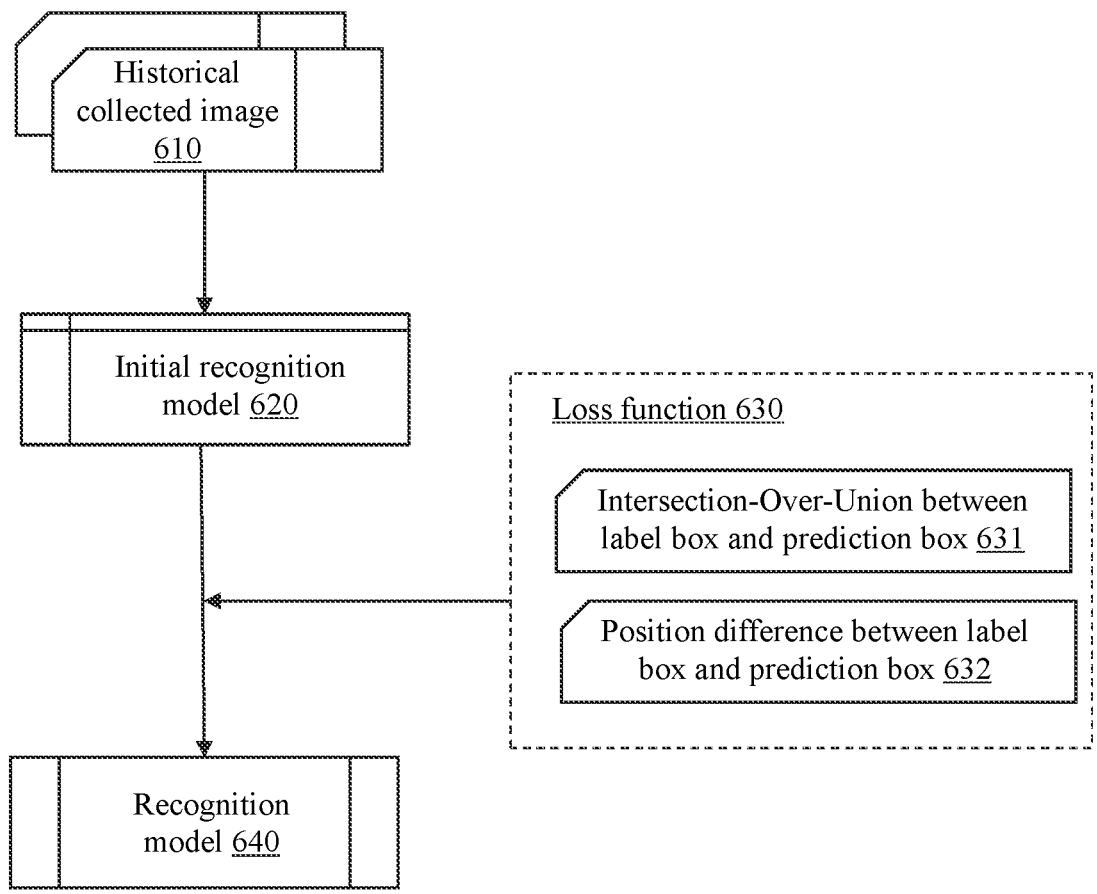
FIG. 6 is an exemplary flowchart of a training of a recognition model according to some embodiments of the present disclosure.

FIG. 6 is an exemplary flowchart of a training of a recognition model according to some embodiments of the present disclosure. In some embodiments, the process 600 may be performed through the training module.

As shown in FIG. 6, in some embodiments, the recognition model may be obtained by training. In some embodiments, multiple sets of training samples may be obtained based on a plurality of collected images, and each set of training samples may include a plurality of training data and the corresponding labels for the training data. In some embodiments, the training data may include historical collected images 610 (i.e., sequences of video images of the spot defects from multiple historical time points), and the training labels may include bounding boxes corresponding to spot defects in the images, which is called label box. The label box includes the real position of the spot defect (e.g., center of the image, etc.) and the real class of the spot defect (e.g., bubble, black spot, etc.). The training label may be obtained manually, for example, a real bounding box may be manually labeled according to the position and class of spot defects in the image.

In some embodiments, the parameters of the initial recognition model 620 may be updated iteratively based on multiple training samples to update the loss function 630 of the model. The model training is completed when the number of iterations reaches the setting threshold, and the trained recognition model 640 may be obtained.

In some embodiments, the loss function is determined through the position loss term and the classification loss term.

The position loss term is used to reflect the error between the predicted positional information of the spot defect and the true position of the spot defect. In some embodiments, the position loss term may be determined by the regression loss function In some embodiments, the regression loss function is composed of the $L_{iou}$ and $L_1$ loss function and its calculation formula are as follows:

$$L_{box} = \lambda_{iou} * L_{iou} + \lambda_{L1} * L_1 \quad (3),$$

where $L_{iou}$ is the intersection-over-union 631 of the label box and the prediction box, and $L_1$ is the position difference 632 between the center point of the label box and the prediction box, and $\lambda_{iou}$ and $\lambda_{L1}$ are weight parameters.

The intersection-over-union 631 of the label box and prediction box is obtained by dividing the intersection of the label box and the prediction box by the union of the real box and the prediction box. The position difference 632 between the center point of the label box and the prediction box is obtained by calculating the distance of the center point between the label box and the prediction box.

In some embodiments, the weight ratio of position difference 632 and intersection-over-union 631 in the loss function may be set within a range of 2.4 to 2.6. For example, $\lambda_{L1}$ may be 5.0, $\lambda_{iou}$ may be 2.0, and a weight ratio may be 2.5.

In some embodiments of the present disclosure, the weight ratio between position difference and intersection-over-union in the loss function is set within a range of 2.4 to 2.6, which is more desirable for application effect on film images.

The classification loss term is used to reflect the error between the predicted classification information of spot defect and the true class of spot defect. In some embodiments, the classification loss term may be determined through the classification loss function.

In some embodiments, the classification loss function may be a cross-entropy loss function, the calculation formula is as follows:

$$H(p,q) = -\Sigma_x p(x) \log q(x) \quad (4),$$

where p denotes the real class of spot defect and q denotes the predicted class of spot defect.

The above two loss functions are input into the Hungarian loss function to obtain the final loss function, and the function is as follows:

$$L_{Hungarian}(y, \hat{y}) = \sum_{i=1}^{N} \left[ -\log \hat{p}_{\hat{\sigma}(i)}(c_i) + 1_{\{c_i \neq \phi\}} L_{box}(b_i, \hat{b}_{\hat{\sigma}(i)}) \right], \quad (5)$$

where $c_i$ denotes a class label, $\hat{\sigma}_{(i)}$ denotes the predicted class, and $\hat{p}_{\hat{\sigma}(i)}(c_i)$ denotes the probability that the class of spot defects is $c_i$. The $1_{\{c_i \neq \phi\}}$ of the formula may not be the empty set. If there is no class, then there is no need for subsequent regression calculations of the prediction box.

The calculation formula of the prediction box regression $L_{box}(b_i, \hat{b}_{\sigma(i)})$ is as follows:

$$L_{box}(b_i, \hat{b}_{\sigma(i)}) = \lambda_{iou} * L_{iou}(b_i, b_{\sigma(i)}) + \lambda_{L1} * |b_i - b_{\sigma(i)}| \quad (6),$$

where $\hat{b}_{\sigma(i)}$ denotes the prediction box of the prediction class, and $b_1$ denotes a label box of the real class.

It should be noted that the above descriptions regarding the recognition model and its training method is merely used for exemplifying and illustrating purposes, but not limit the scope of application of the present disclosure. For those skilled in the art, corrections and changes may be performed on the above process under the guidance of the present disclosure. However, these corrections and changes are still within the scope of the present disclosure.

Figure 7:
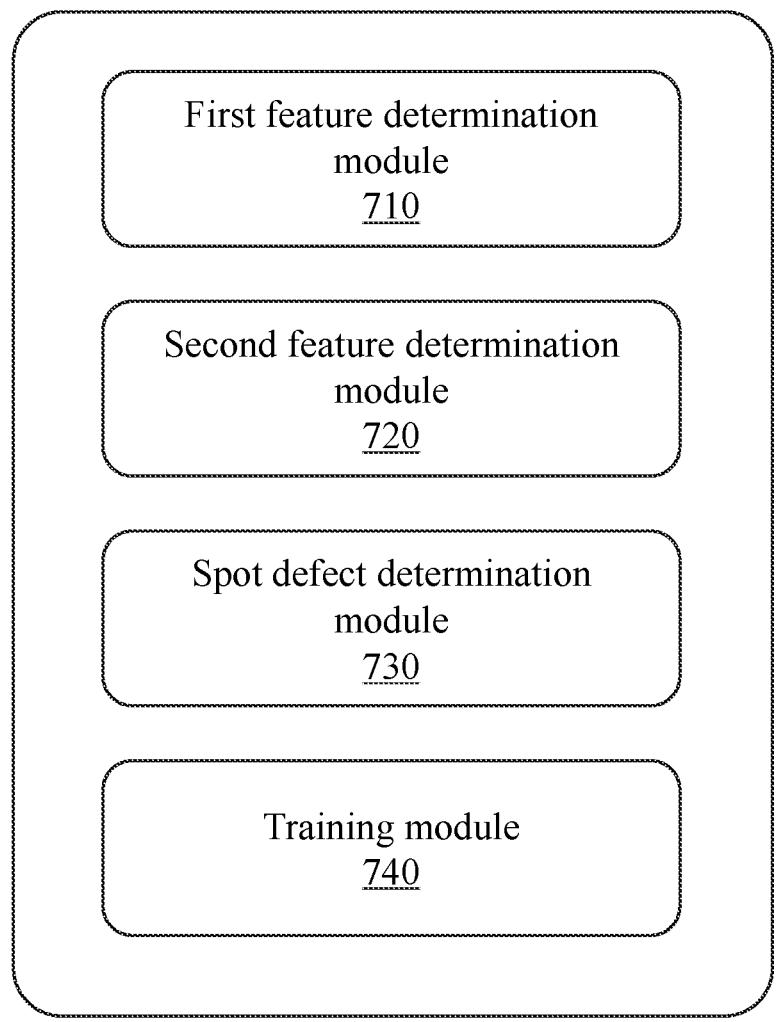
FIG. 7 is an exemplary module diagram of the system for recognizing a small target according to some embodiments of the present disclosure.

FIG. 7 is an exemplary module diagram of the system for recognizing a small target according to some embodiments of the present disclosure. As shown in FIG. 7, the system 700 for recognizing small targets may include at least a first feature determination module 710, a second feature determination module 720, a spot defect determination module 730, and a training module 740.

The first feature determination module 710 may be configured to determine a first feature map based on the collected image and determine a second feature map by fusing with the second feature map based on the first feature map.

In some embodiments, the first feature determination module 710 may determine the first attention based on QK distance and the probability density. The QK distance is the contraposition distance between the vector $q_i$ in the Q matrix and the vector $k_i$ in the K matrix. The probability density is determined based on the contraposition distance through a probability density function.

The second feature determination module 720 may be configured to determine a third feature map based on the second feature map.

In some embodiments, the second feature determination 720 includes a self-attention unit configured to determine the attention features based on a Q matrix, a first K matrix, and the first V matrix, the Q matrix and the first K matrix are feature maps generated through the linear transformation of the second feature map, and the first V matrix is generated through correlation calculation of the Q matrix and the first K matrix.

In some embodiments, the self-attention unit in the second feature determination module 720 may be configured to generate a second K matrix through performing the dimension reduction of convolution on the first K matrix and generate the second V matrix through performing the dimension reduction of convolution on the first V matrix, and the second K matrix and the second V matrix are used for subsequent attention calculations.

In some embodiments, the self-attention unit in the second feature determination module 720 may be further configured to determine a first attention through calculation of matrix addition based on the Q matrix and a third K matrix, determine a second attention through calculation of matrix multiplication based on the Q matrix and the third K matrix, and determine an attention matrix based on the first attention and the second attention, and the attention matrix is used for residual and normalization calculation and feedforward neural network calculation.

The spot defect determination module 730 may be configured to determine positional information of the spot defect through a first determination layer based on the third feature map and determine classification information of the spot defect through a second determination layer based on the third feature.

The training module model 740 may be configured to train the recognition model, and a loss function during the training includes a position loss item, the position loss item including an intersection-over-union of a label box and a prediction box and a position difference between the label box and the prediction box.

In some embodiments, a weight ratio between the position difference and the intersection-over-union in the loss function of the training module 740 is within a range of 2.4 to 2.6.

It should be noted that the above descriptions of the system for recognizing small targets and its modules is merely for describing convenience, and not limit the present disclosure within the scope of the cited embodiments. It will be understood that for those skilled in the art, after understanding the principle of the system, it is possible to arbitrarily combine various modules, or form subsystems to connect with other modules without departing from this principle. In some embodiments, the first feature determination module, the second feature determination module, the spot defect determination module, and the training module disclosed in FIG. 1 may be different modules in one system, or one module may implement the functions of two or more of the above modules. For example, each module may share a storage module, and each module may also have its own storage modules. Those variations and modifications may be within the scope of the protection of one or more embodiments of the disclosure.

Some embodiments of the present disclosure further include a non-transitory computer readable storage medium including at least one set of instructions, when executed by at least one processor of a computing device, which causes the computing device to perform a method for recognizing a spot defect in the present disclosure.

In the different parts of the present disclosure, a method for recognizing a small target may also be called a method for recognizing defect based on a deep learning network. The first feature determination layer may include a feature extraction branch and an additional positional information branch. The second feature determination layer may be referred to as the transformer branch. The first determination layer and the second determination layer may be referred to together as prediction branches of the feedforward neural network. A self attention layer may be referred to as the self-attention layer. The residual and normalization calculations may be referred to as the Add&Norm layer.

More embodiments are shown below.

Figure 8:
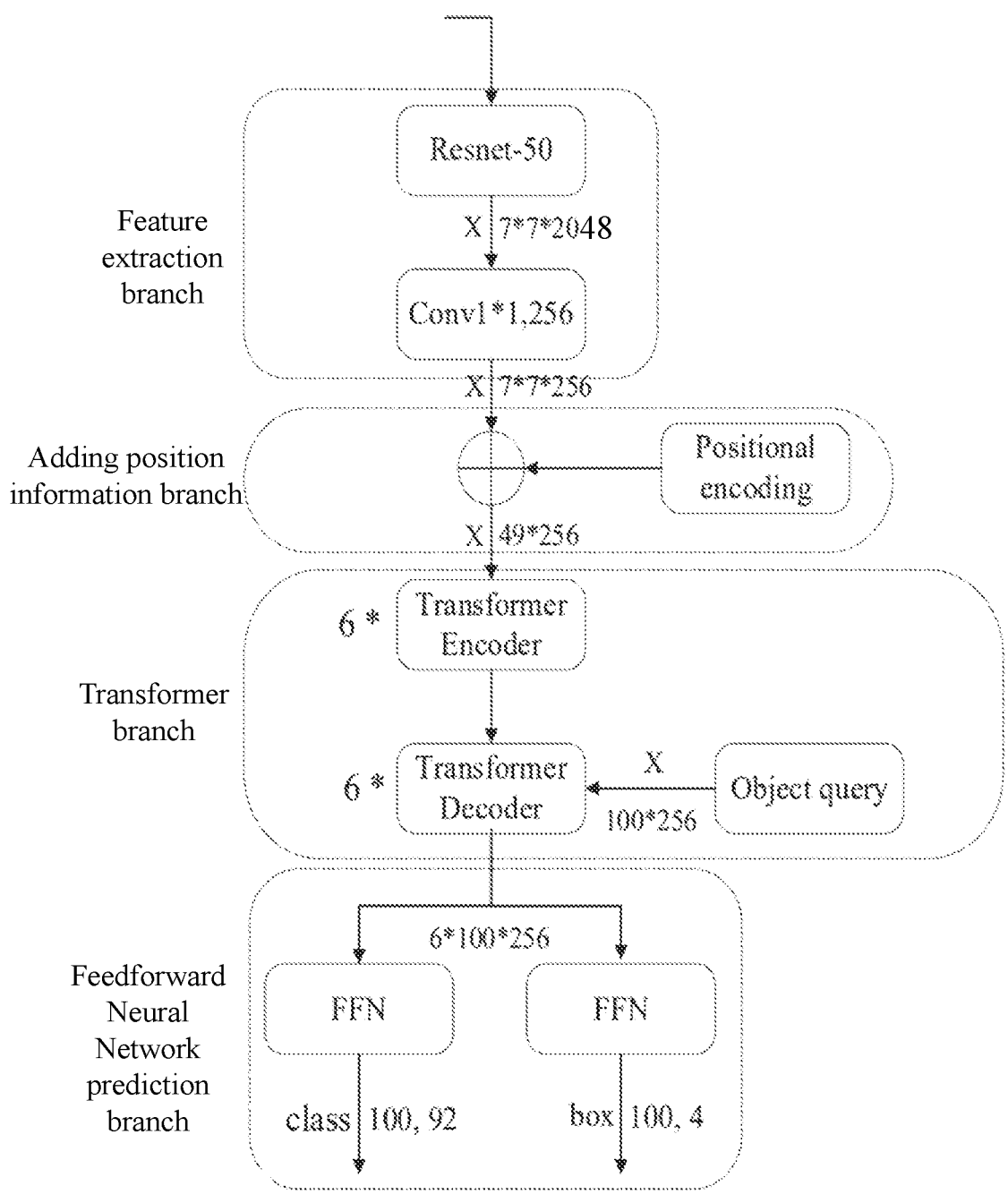
FIG. 8 is an exemplary structure diagram of an overall network of a deep learning network according to some embodiments of the present disclosure.

Some embodiments of the present disclosure provide a method for recognizing defect based on deep learning networks. As shown in FIG. 8, the network framework structure includes four branches, which respectively are a feature extraction branch (Resnet-50), a positional encoding branch (positional encoding), a transformer branch (transformer encoder and decoder), and a feedforward neural network prediction branch (FNN).

Figure 11:
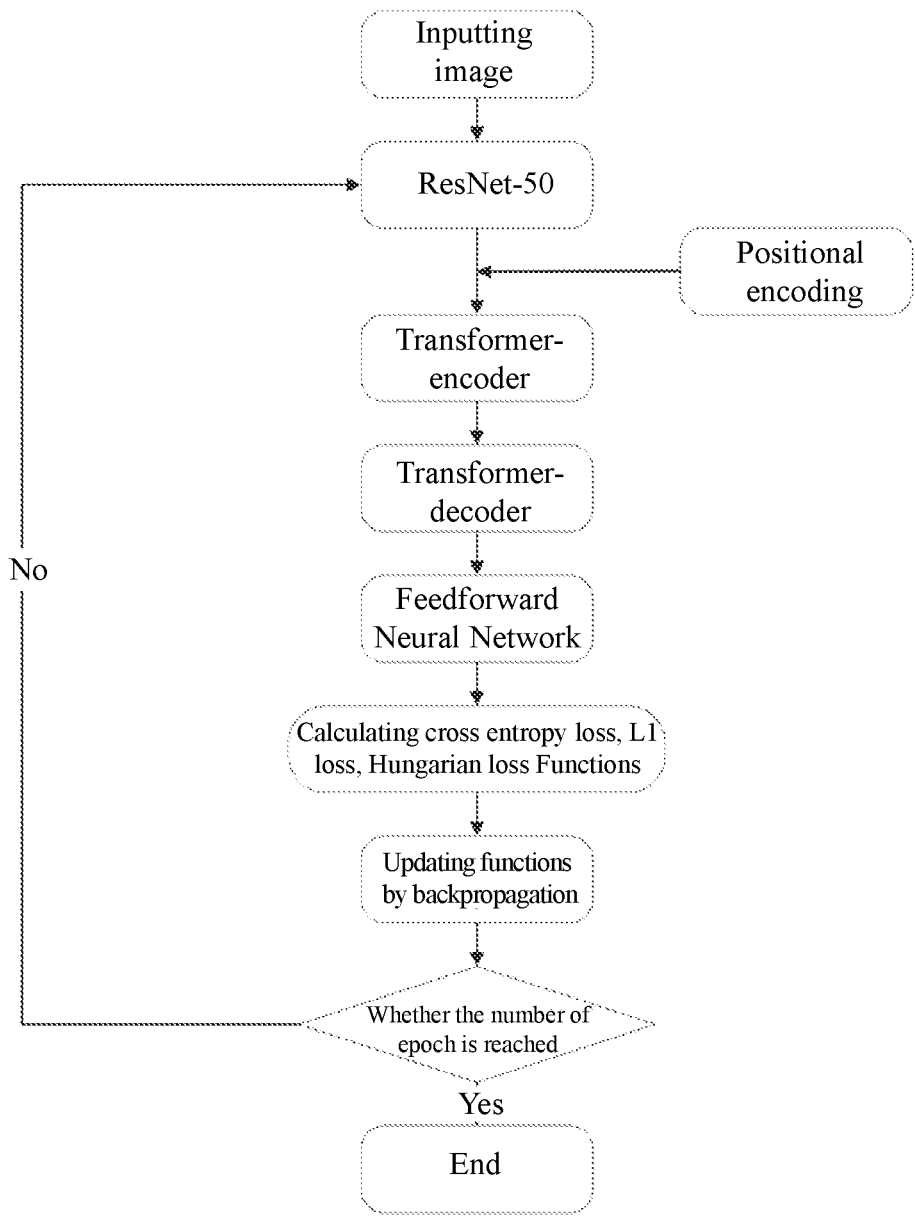
FIG. 11 is an exemplary flowchart of the training of the deep learning network according to some embodiments of the present disclosure.

The training process of the network is shown in FIG. 11. The brief steps are as follows: i. obtaining a feature map of defects through the feature extraction network. ii. Flattening the feature map and adding positional encoding. iii. Passing the feature map through the encoder of the transformer branch. iv. Passing the feature map through the decoder of the transformer branch. v. Inputting the last output to the feedforward neural network prediction (FNN) for performing regression and classification. vi. Calculating the classification cross-entropy loss $L_{Class}$, $L_1$ loss $L_1$, intersection-over-union ratio loss $L_{iou}$, and Hungarian loss function. vii. Updating network parameters through backpropagation.

Figure 12:
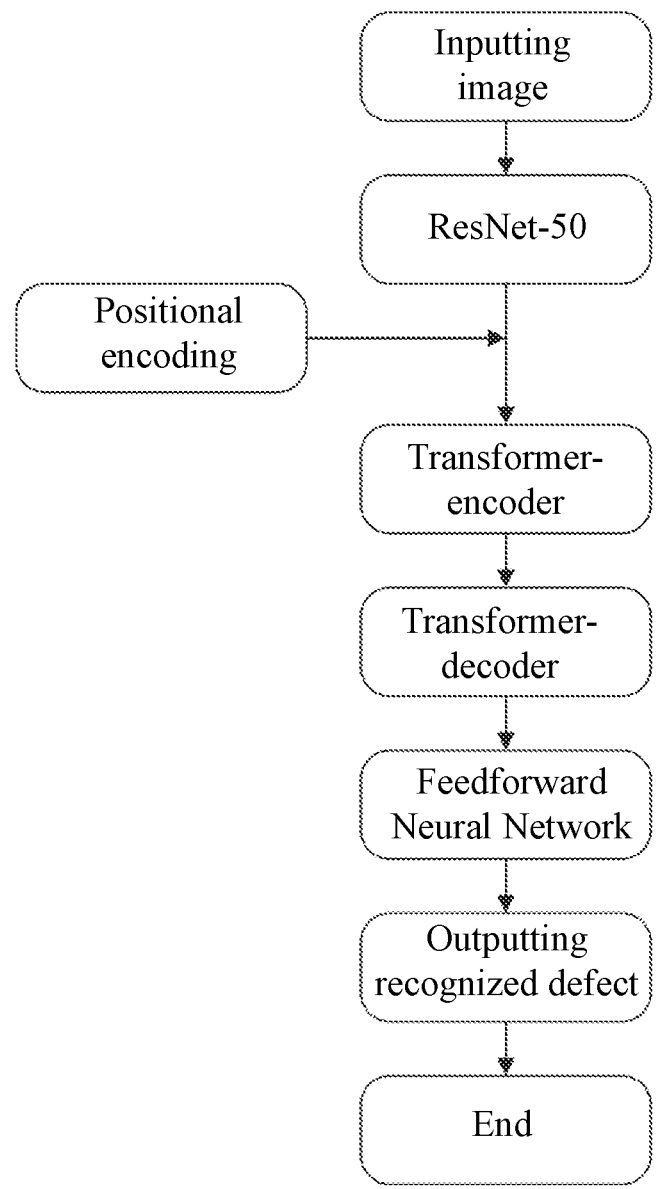
FIG. 12 is an exemplary flowchart of a method for recognizing defects based on the deep learning network according to some embodiments of the present disclosure.

The forward inference process of the network is shown in FIG. 12. The brief steps are as follows: i. Obtaining a feature map of defects through the feature extraction network. ii. Flattening the feature map and adding positional encoding. iii. Passing the feature map through the encoder of the transformer branch. iv. Passing the feature map through the decoder of the transformer branch. v. Inputting the last output to the feedforward neural network prediction (FNN) for performing regression and classification. vi. Predicting the position and class of defect when using the trained network to perform forward inference.

A method for recognizing defects based on a deep learning network is provided by some embodiments of the present disclosure, including the following steps:

In Step 1, capturing the sequences of video image that include spot defects, and inputting the sequences to the Resnet-50 network for feature extraction, the specific operation is as follows:

First, the image is input to the Resnet-50 feature extraction network to obtain a feature map of 7*7*2048, and the number of channels of the feature map is reduced through convolution with a kernel size of 1, the step size of 1, the number of convolutions of 256, and a map of 7*7*256 through convolution is obtained.

In Step 2, flattening the output feature map, then adding positional encoding information, and putting the obtained feature map into the transformer-encoder.

The specific flattening operation is as follows: the shape of the feature map is resized from 7*7*256 into 49*256, i.e., resizing H*W*C to (H*W)*C, compressing the height and width into the same dimension, and the feature map through flattening being referred to as X.

The positional encoding operation is as follows: The 256 dimensions in the feature map of 49*256 are divided into x-direction and y-direction, and the first 128 dimensions are in x-direction and the last 128 dimensions are in y-direction. First positional encoding is added in the x-direction, the positional encoding function is shown below, where in the formula, d is taken as 256, k is taken as the current position, x is the corresponding value in the feature map, if i is an even, then the sinx function is used, and if i is an odd, then the cosx function is used, and positional encoding is added in y-direction. The calculated matrix is added to the Query and Key matrices in Step 3 and Step 4.

$$f(x)^{(i)} = \begin{cases} \sin(w_k * x), & i = 2k \\ \cos(w_k * x), & i = 2k+1 \end{cases},$$

$$w_k = \frac{1}{10000^{2k/d}},$$

where x represents the current position of the pixel point in the row or column of the image, 2k and 2k+1 represent whether the current position is even or odd, respectively, and d represents the dimension of the vector.

In Step 3, adding the attention branch of Gaussian distribution to the Self-Attention layer in the transformer-encoder, and performing convolution and dimension reduction on the Key and Value matrices.

Figure 9:
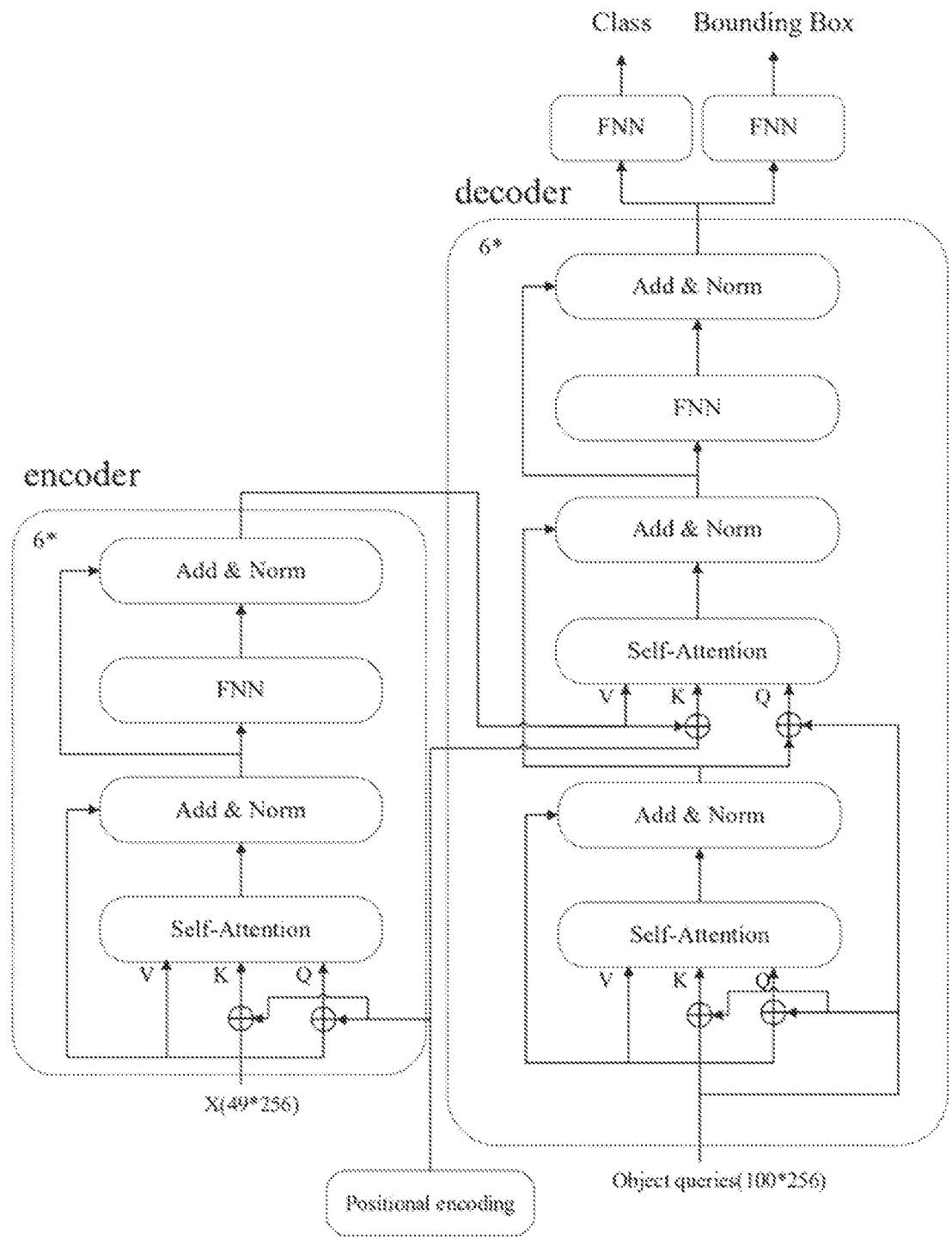
FIG. 9 is an exemplary structure diagram of a transformer branch of the deep learning network according to some embodiments of the present disclosure.
Figure 10:
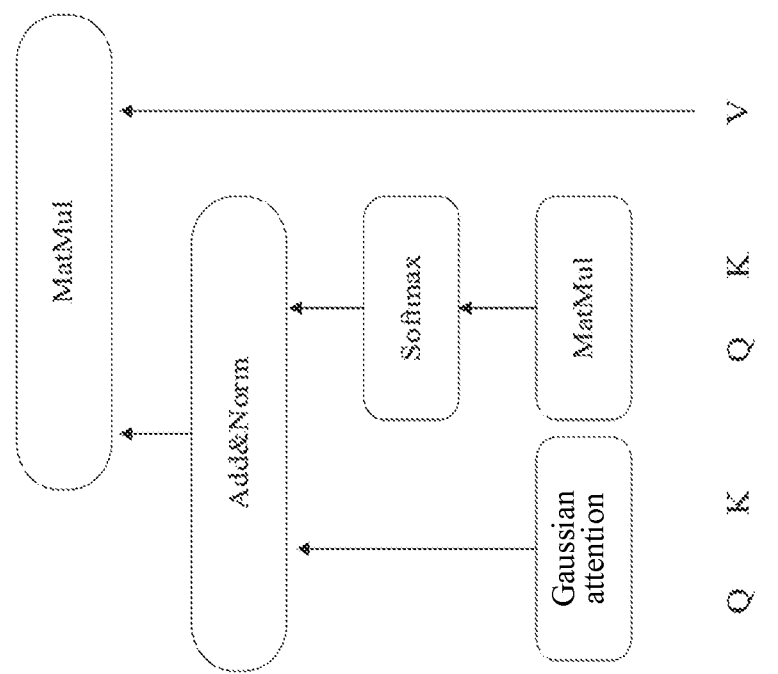
FIG. 10 is an exemplary structure diagram of a feature-map-transformed matrix and the self-attention layer according to some embodiments of the present disclosure.
Figure 10:
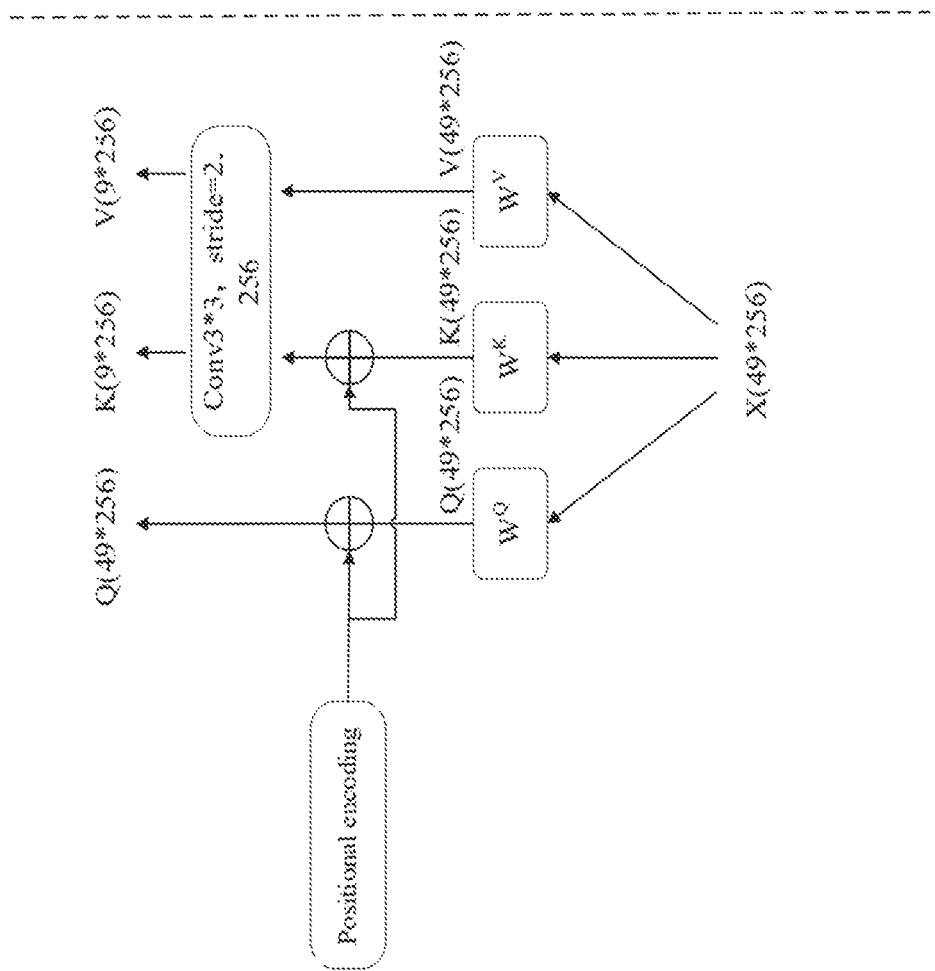

As shown in FIG. 9, the structure of transformer-encoder from bottom to up are a Self-Attention layer, a Add&Norm layer, an FNN layer, and a Add&Norm layer. The specific process is as follows:

First, converting the feature map X into Q, K, and V matrices, which is specifically shown on the left side of FIG. 10, and then passing through the Self-Attention layer, the specific structure of the Self-Attention layer is shown on the right side of FIG. 10.

Second, passing through the Add&Norm layer, the Add operation is to directly add the calculation result of the self-attention layer with the original feature map X, which is similar to the residual structure, and Norm operation, then normalizing the result of Add operation.

Third, passing through the FNN layer, specifically, the number of channels is first changed from 256 to 2048 through a fully connection layer. Then the dropout is set to 0.1 by the Relu activation function, and finally the number of channels is changed from 2048 to 256 through a fully connection layer and the dropout is set to 0.1.

Fourth, passing through the Add&Norm layer, the specific operation is similar to the second step.

The embodiment improves the K and V matrices before the self-attention layer in the encoders, as shown on the left side of FIG. 10. Specifically, the corresponding three matrices of Q, K, and V with the size of 49*256 are obtained through three linear layers ($W^Q$, $W^K$, $W^V$) respectively according to the input feature map X. The Q and K matrices are added with the positional encoding obtained in step 2, the K and V matrices are flattened to 7*7*256 and perform the convolution with a convolution kernel of 3*3, the step size is 2, the number of convolution kernels is the same as the input channels, and then the obtained convolution of 3*3*256 is flattened. In previous experiments, it was found that the Q, K, and V matrices were of low rank, which means that the dimensions of the Q, K, and V matrices are not so high in actual training, thus the present disclosure does not lose much information by processing with convolution.

The size of the Q matrix, the K matrix, and the V matrix before improvement is H*W*C, then the calculation complexity is $O((H*W)^2*C)$, after improvement the calculation complexity is $O(H*W*h*w*C)$, where H*W=49 turns to h*w=9 through convolution. Compared with the Attention before improvement, the calculation complexity is reduced by about 5 times, which greatly improves the calculation speed of the Self-Attention layer.

The embodiment adds an attention branch of Gaussian distribution to the self-attention layer in the encoder, as shown on the right side of FIG. 10. The reason for the adding the attention branch is that a piece of defect tends to appear in the current pixel points and its surrounding pixel points, although feature extraction through Resnet-50 may increase the locality around the current pixel points, it is not sensitive to the sense locality as the depth of the network is deeper, which is not conducive to the detecting small defect.

The embodiment calculates the Matmul (matrix multiplication) and softmax functions of Q and K for its own Attention, at the same time, calculates the Gaussian Attention of Q, K matrices, then adds the both results, normalizes the results through Norm layer, and finally multiplies with V matrix to obtain the final Attention matrix.

The standard deviation $\sigma^2=1/(2\pi)$ of the standard normal distribution is used in the Attention branch of the Gaussian distribution of the embodiment, the probability density function is $\Phi(s)=e^{-\pi s^2}$, where s is the distance between two $q^i$ (row vectors in the Q matrix) and kl (row vectors in the K matrix) vectors. Since only one matrix is added, the accuracy of detection to defect may be increased without affecting the speed.

In the embodiment, 6 decoders are set. The above two steps are performed on the self-attention of each encoder, and the final results are input into the decoder.

In Step 4, the Q output from the final layer of the transformer's encoder is input into the decoder, and object queries (learnable matrix) are input into the decoder.

Object Queries is a matrix with a random initialization size of 100*256, where 100 is the number of targets set in advance. In the process of training, it may learn the feature encoding input by the encoder. Then the decoder may convert 100 queries to 100 target output, i.e., the relationship between the learning goals and the contents of the entire map, which finally may be output to FNN (feedforward neural network prediction branch) to classify and predict.

The structure of the transformer-decoder, as shown in the dashed box in the right half of FIG. 9, from bottom to top is a Self-Attention layer, a Add&Norm layer, a Self-Attention layer, a Add&Norm layer, an FNN layer, and a Add&Norm layer, respectively. The specific processes are as follows:

First, after converting object queries (learnable matrices) to Q, K, and V matrices, the Q, K matrices and object queries (learnable matrices) being used to learn the relationship between the target and the global, and then the Q, K, V matrices are input into the Self-Attention layer.

Second, passing through the add & norm layer.

Third, the Q in self-attention is added by the output of the previous step and the object queries (learnable matrix), where the K and V matrices are similar to encoder, and the Attention matrix as the result of encoder is passed through the linear layer to obtain K and V, and the dimension reduction of K and V is not performed. It is noted here that the K matrix needs to be added with positional encoding, and V matrix does not need to be added with positional encoding.

Fourth, passing through the add & norm layer.

Fifth, passing through the FNN layer, and the settings of the FNN layer are consistent with encoder.

Sixth, passing through the Add&Norm layer.

In Step 5, the results of the transformer-decoder are input into two branches. The classification branches are classified through the full connection, and the regression branches perform a regression of the bounding box through multi-layer perceptron.

The decoder will eventually output 6*100*256, where 6 represents 6 decoders, and the embodiment only needs to take the result of the last decoder, and during training, the effect will be improved by adding the same loss function supervision to the remaining 5 decoders, so the results of six decoders will be output during training. For the classification branch, the number of channels is directly changed from 256 to n through the full connection, 100*n is output, where n represents the number of defect classes in the defect dataset. A triple-layers MLP is used for prediction box with 256 input channels, 256 hidden layers, 4 output layers, and the output of the triple-layers MLP is 100*4.

In Step 6, during network training, the regression loss function is composed of the $L_{iou}$ and $L_1$ loss functions, $L_{box}=\lambda_{iou}*L_{iou}+\lambda_{L1}*L_1$, and the related experiment proved that $\lambda_{iou}$ is better taken as 2.0 and $\lambda_{L1}$ is better taken as 5.0. The classification loss function is the cross-entropy loss function, and finally, both loss functions are input into the Hungarian loss function to calculate the loss. Hungarian loss function is shown below:

$$L_{Hungarian}(y, \hat{y}) = \sum_{i=1}^{N} \left[ -\log \hat{p}_{\hat{\sigma}(i)}(c_i) + 1_{\{c_i \neq \phi\}} L_{box}(b_i, \hat{b}_{\hat{\sigma}(i)}) \right],$$

where $c_i$ denotes class label, $\hat{\sigma}_{(i)}$ is predicted class, $c_i$ (the class label) in $1_{\{c_i \neq \phi\}}$ cannot be empty sets. If there are no class, there is no need to calculate the following prediction box regression. Where $L_{box}$ is as follows:

$$L_{box}=\lambda_{iou}*L_{iou}(b_i,\hat{b}_{\sigma(i)})+\lambda_{L1}*|b_i-\hat{b}_{\sigma(i)}|_1,$$

where $\hat{b}_{\sigma(i)}$ is the prediction box, $b_i$ is the real box of the prediction class, and $\hat{p}_{\hat{\sigma}(i)}*(c_i)$ is the probability of the class $c_i$.

In step 7, predicting the position of defects and the class of defects when using the trained network for forward inference.

The basic concepts have been described above, obviously, for those skilled in the art, the above detailed disclosure is merely a way of example, which does not constitute a limitation of the present specification. Although there is no clear explanation here, those skilled in the art may make various modifications, improvements, and corrections for the present disclosure. This class of modification, improvement, and corrections are recommended in present disclosure, so this class is modified, improved, and the amendment remains in the spirit and scope of the exemplary embodiment of the present disclosure.

Meanwhile, the present disclosure uses specific words to describe embodiments of the present specification. As "one embodiment," "an embodiment," and/or "some embodiments" means a certain feature, structure, or characteristic of at least one embodiment of the present disclosure. Therefore, it is emphasized and should be appreciated that two or more references to "an embodiment" or "one embodiment" or "an alternative embodiment" in various parts of this specification are not necessarily all referring to the same embodiment. Further, certain features, structures, or features of one or more embodiments of the present disclosure can be combined.

Moreover, unless the claims are clearly stated, the sequence of the present disclosure, the use of the digital letters, or the use of other names, is not used to define the order of the present specification processes and methods. Although some embodiments of the invention currently considered useful have been discussed through various examples in the above disclosure, it should be understood that such details are only for the purpose of illustration, and the additional claims are not limited to the disclosed embodiments. On the contrary, the claims are intended to cover all amendments and equivalent combinations in line with the essence and scope of the embodiments of the specification. For example, although the implementation of various components described above may be embodied in a hardware device, it may also be implemented as a software only solution, e.g., an installation on an existing server or mobile device.

Similarly, it should be noted that in order to simplify the expression disclosed in the present disclosure and help the understanding of one or more invention embodiments, in the previous description of the embodiments of the present disclosure, a variety of features are sometimes combined into one embodiment, drawings or description thereof. However, the present disclosure method does not mean that the features needed in the spectrum ratio of this disclosure ratio are more characteristic. Rather, claimed subject matter may lie in less than all features of a single foregoing disclosed embodiment.

In some embodiments, the numerical parameters should be construed in light of the number of reported significant digits and by applying ordinary rounding techniques. Unless otherwise stated, "about," "approximate," or "substantially" may indicate ±20% variation of the value it describes. Correspondingly, in some embodiments, the numerical parameters used in the present disclosure and claims may be approximate values, and the approximate values may be changed according to the required characteristics of individual embodiments. In some embodiments, the numerical parameters should be construed in light of the number of reported significant digits and by applying ordinary rounding techniques. Although the numerical domains and parameters used in the present disclosure are used to confirm its range breadth, in the specific embodiment, the settings of such values are as accurate as possible within the feasible range.

For each patent, patent application, patent application publication and other materials referenced by the present disclosure, such as articles, books, instructions, publications, documentation, etc., hereby incorporated herein by reference. Except for the application history documentation of the present specification or conflict, there is also an except for documents (currently or after the present disclosure) in the widest range of documents (currently or later). It should be noted that if the description, definition, and/or terms used in the appended materials of the present disclosure is inconsistent or conflicts with the content described in the present disclosure, the use of the description, definition and/or terms of the present disclosure shall prevail.

Finally, it should be understood that the embodiments described in the present disclosure are intended to illustrate the principles of the embodiments of the present disclosure. Other deformations may also belong to the scope of this disclosure. Thus, as an example, not limited, the alternative configuration of the present disclosure embodiment can be consistent with the teachings of the present disclosure. Accordingly, the embodiments of the present disclosure are not limited to the embodiments of the present disclosure clearly described and described.

What is claimed is:

1. A method for recognizing a spot defect, comprising:
   determining spot defect information through a recognition model based on a collected image, the recognition model including a first feature determination layer, a second feature determination layer, and a spot defect determination layer, wherein
   the second feature determination layer includes a self-attention layer used to determine an attention feature based on a Q matrix, a first K matrix, and a first V matrix, and the self-attention layer is further used to determine a first attention based on a QK distance and a probability density;
   the QK distance is a contraposition distance between a vector $q_{ij}$ in the Q matrix and a vector $k_{ij}$ in the K matrix; and
   the probability density is determined through a probability density function based on the contraposition distance;
   determining, based on the collected image, a first feature map through the first feature determination layer, and determining, based on the first feature map, a second feature map by fusing with positional encoding through the first feature determination layer;
   determining, based on the second feature map, a third feature map through the second feature determination layer; and
   determining, based on the third feature map, positional information of the spot defect through a first determination layer, and determining, based on the third feature map, classification information of the spot defect through a second determination layer.

2. The method of claim 1, wherein
the Q matrix and the first K matrix are feature maps generated through a linear transformation of the second feature map, and
the first V matrix is generated through correlation calculation of the Q matrix and the first K matrix.

3. The method of claim 2, wherein the self-attention layer is further used to:
generate a second K matrix through performing a dimension reduction of convolution on the first K matrix; and
generate a second V matrix through performing the dimension reduction of convolution on the first V matrix, wherein the second K matrix and the second V matrix are used for attention calculation.

4. The method of claim 2, wherein the self-attention layer is further used to:
determine a second attention through calculation of matrix multiplication based on the Q matrix and a third K matrix; and
determine an attention matrix based on the first attention and the second attention, wherein the attention matrix is used for residual and normalization calculation and feedforward neural network calculation.

5. The method of claim 1, wherein the recognition model is obtained through training, and a loss function during the training includes a position loss item, the position loss item including an intersection-over-union of a label box and a prediction box and a position difference between the label box and the prediction box.

6. The method of claim 5, wherein a weight ratio between the position difference and the intersection-over-union in the loss function is within a range of 2.4 to 2.6.

7. A system for recognizing a spot defect, comprising
a non-transitory computer-readable storage medium storing at least one set of instructions; and
at least one processor in communication with the non-transitory computer-readable storage medium, when executing the at least one set of instructions, the at least one processor is directed to cause the system to:
determine a first feature map based on a collected image and determine a second feature map through fusing with positional encoding based on the first feature map;
determine a third feature map based on the second feature map, wherein the at least one processor is further directed to cause the system to:
determine an attention feature based on a Q matrix, a first K matrix, and a first V matrix, and determine a first attention based on a QK distance and a probability density; wherein
the QK distance is a contraposition distance between a vector $q_{ij}$ in the Q matrix and a vector $k_{ij}$ in the K matrix; and
the probability density is determined through a probability density function based on the contraposition distance; and
determine positional information of the spot defect based on the third feature map and determine classification information of the spot defect based on the third feature map.

8. The system of claim 7, wherein
the Q matrix and the first K matrix are feature maps generated through a linear transformation of the second feature map, and
the first V matrix is generated through correlation calculation of the Q matrix and the first K matrix.

9. The system of claim 8, wherein the at least one processor is further directed to cause the system to:
generate a second K matrix through performing a dimension reduction of convolution on the first K matrix; and
generate a second V matrix through performing the dimension reduction of convolution on the first V matrix, wherein the second K matrix and the second V matrix are used for attention calculation.

10. The system of claim 8, wherein the at least one processor is further directed to cause the system to:
determine a second attention through calculation of matrix multiplication based on the Q matrix and a third K matrix; and
determine an attention matrix based on the first attention and the second attention, wherein the attention matrix is used for residual and normalization calculation and feedforward neural network calculation.

11. The system of claim 7, wherein the at least one processor is further directed to cause the system to train a recognition model, wherein a loss function during the training includes a position loss item, and the position loss item includes an intersection-over-union of a label box and a prediction box and a position difference between the label box and the prediction box.

12. The system of claim 11, wherein a weight ratio between the position difference and the intersection-over-union in the loss function is within a range of 2.4 to 2.6.

13. A non-transitory computer readable storage medium, comprising at least one set of instructions, when executed by at least one processor of a computing device, causing the computing device to perform a method for recognizing a spot defect, the method comprising:
determining spot defect information through a recognition model based on a collected image, the recognition model including a first feature determination layer, a second feature determination layer, and a spot defect determination layer; wherein
the second feature determination layer includes a self-attention layer used to determine attention feature based on a Q matrix, a first K matrix, and a first V matrix, and the self-attention layer is further used to determine a first attention based on a QK distance and a probability density;
the QK distance is a contraposition distance between a vector $q_{ij}$ in the Q matrix and a vector $k_{ij}$ in the K matrix; and
and the probability density is determined through a probability density function based on the contraposition distance;
determining, based on the collected image, a first feature map through the first feature determination layer, and determining, based on the first feature map, a second feature map by fusing with positional encoding through the first feature determination layer;
determining, based on the second feature map, a third feature map through the second feature determination layer;
determining, based on the third feature map, positional information of the spot defect through a first determination layer, and determining, based on the third feature map, classification information of the spot defect through a second determination layer.

* * * * *